UNITED STATES PATENT OFFICE 2,569,314

N,N - DIMETHYL- N'-(4- HALOBENZYL)-N'-
(2-PYRIDYL) ETHYLENEDIAMINES AND
PREPARATION OF THE SAME

Kenneth L. Howard, Westfield, N. J., assignor to
American Cyanamid Company, New York,
N. Y., a corporation of Maine No Drawing. Application December 17, 1947,
Serial No. 792,332

8 Claims. (Cl. 260—296)

This application relates to new organic compounds having anti-histamine properties.

In my co-pending application, Serial Number 753,384, filed June 7, 1947, of which this is a continuation-in-part, new compounds are disclosed which have anti-histamine properties and which are effective in treating such allergic conditions as hay fever, certain types of asthma, food allergies, and similar conditions. The compounds described and claimed in that case have the general formula

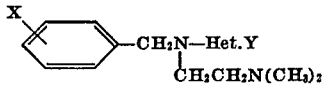

in which at least one of the radicals X and Y is halogen and Het. is a nitrogen containing heterocyclic ring such as pyridine, pyrazine, pyridazine, pyrimidine, etc.

While the compounds represented by the above formula are therapeutically useful because of their anti-histamine effects, I have discovered that a particular group of products in which the halogen atom is at the para position on the benzene ring and Het is pyridyl possess surprisingly high anti-histaminic activity, and appear to be in a class by themselves in this regard. These new compounds have the following structure

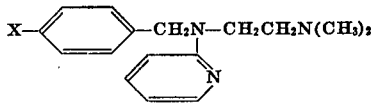

X being one of the halogens. Within this small group of specific compounds the most active appears to be that having fluorine as the substituent. The next in line of activity is the compound having chlorine as the substituent at the para position on the benzene ring. This compound, while not as active as the fluorine derivative, is several times as active as any anti-histamine yet described. The bromo and iodo derivatives are also highly active Although several distinct methods of preparing these new compounds will occur to those skilled in the art, a preferred method is to react a p-halobenzyl halide with N,N-dimethyl-N'-[2-pyridyl] ethylenediamine or an alkali metal salt thereof in an inert non-hydroxylated organic solvent at any practical temperature from about 0° C. to 180° C. The temperature of the reaction and the nature of the solvent do not appear to be critical factors, although when reacting the p-halobenzyl halide with a N,N-dimethyl-N'-[2-pyridyl] ethylenediamine an alkaline substance should be present such as pyridine, quinoline, diethylamine, sodium hydroxide, sodium bicarbonate or the like to react with the acid liberated by the reaction.

The preparation and properties of each of the four specific halogen compounds of the present invention will now be described. All parts are by weight unless otherwise indicated.

EXAMPLE 1

N,N - dimethyl - N' - (4 - chlorobenzyl) - N' - (2-pyridyl) ethylenediamine hydrochloride

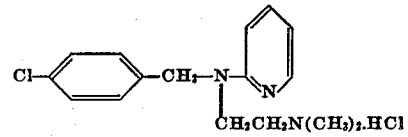

A solution comprising 40 parts of 2-bromopyridine, 100 parts of N,N-dimethyl-N'-(4-chlorobenzyl) ethylenediamine and 100 parts of quinoline is heated at 140°–145° C. for 5 hours. The oil layer after washing with 30% sodium hydroxide solution is distilled, and the fraction which distills at 142°–170° C. when the pressure is about one millimeter is collected. This oil is converted to the monohydrochloride and recrystallized from a mixture of mixed amyl alcohols and ether. The monohydrochloride salt of N,N-dimethyl N' - (4 - chlorobenzyl)-N'-(2-pyridyl) ethylenediamine is obtained which melts at 167°–168.4° C.

Other acid salts of the above compound can be prepared by treatment of the free base with an appropriate acid. Although the free base may be used for many important applications of the new compound, the acid salts are generally preferred because of their better physical properties.

The above product may also be prepared using an alkali metal salt of the ethylenediamine. Also the compounds may be prepared from para-chlorobenzyl halide and an alkali metal salt of N,N-dimethyl - N'-[2-pyridyl] ethylenediamine.

EXAMPLE 2

A 44 g. (0.4 M.) sample of p-fluorotoluene in 100 g. of carbon tetrachloride as solvent was treated with approximately 28 g. (0.4 M.) of chlorine in the presence of direct ultraviolet light. The best temperature for the chlorination was 60° C. or higher. The reaction mixture was distilled and fractions boiling at 35°–75° C./20 mm. (21 g.) and 75°–78° C/20 mm. (20.5 g.) were collected. The low boiling fraction was again treated with chlorine in the presence of ultraviolet light but this time in the absence of solvent. When the temperature of the resulting exothermic reaction reached 120° C., the chlorination was stopped and the material distilled to yield an additional 13 g. of product, B. P. 75°–78° C./20 mm. The total yield of water white product was 33.5 g. (58% of theory).

A suspension of 0.16 M. of the sodium salt of N,N-dimethyl-N'-(2-pyridyl) ethylenediamine in 200 cc. of toluene was prepared from 26.4 g. (0.16 M.) of N,N-dimethyl-N'-(2-pyridyl) ethylenediamine and 3.85 g. (0.16 M.) of sodium hydride and a solution of 23.2 g. (0.16 M.) of p-fluorobenzyl chloride in 50 cc. of toluene added. After the resulting exothermic reaction had subsided the mixture was refluxed for a short time, allowed to cool and filtered. The filtrate was washed with water and concentrated by distillation to yield a black oil. Distillation of this in vacuo yielded 19.0 g. (43.5%) of product boiling at 140°–160° C. at about 0.1 mm. and 5 g. of recovered N,N-dimethyl-N'-(2-pyridyl) ethylenediamine boiling at 155°–170° C. at about 0.1 mm.

The product was redistilled in a microfractionating column to yield 14.2 g. (32.5%) of pure material boiling at 150°–160° C. at about 0.1 mm., $n_D^{27}=1.561$. This was treated with one equivalent of alcoholic hydrogen chloride to yield 14.5 g. (91%) of the crystalline monohydrochloride on precipitation with ether. After three recrystallizations from 60–70 cc. portions of toluene containing 10–15 cc. of ethanol the salt was obtained as colorless crystalline plates melting at about 169°–170° C.

The chlorination of p-fluorotoluene may be carried out in the presence of ordinary light or in the absence of direct light altogether, providing that catalysts are not added to the reaction mixture. Bromination may be substituted for chlorination. The temperatures used are not critical. An increase of temperature increases the rate of the halogenation reaction but has no other effect.

Other alkali metal salts of N,N-dimethyl-N'-(2-pyridyl) ethylenediamine may be used in the above reaction. Such include lithium and the sodium salts. Alkaline earth metal salts may likewise be used. Other solvents such as benzene, xylene, saturated hydrocarbons, and other inert liquids may be used in place of toluene. The temperatures of the reaction are not critical within ordinary practical limits.

EXAMPLE 3

*N,N-dimethyl-N'-(2-pyridyl)-N'-(p-bromobenzyl)-ethylenediamine hydrochloride*

To a mixture of 100 cc. of liquid ammonia and about 80 mg. of black iron oxide was added 0.78 g. (.020 atom) of potassium. When all of the potassium had reacted, 3.3 g. (.020 mole) of N,N-dimethyl-N'-(2-pyridyl) ethylenediamine was added. After the addtion of 75 cc. of dry toluene the ammonia was removed on the steam bath. To the cooled and stirred mixture was added 4.26 g. (.021 mole) of p-bromobenzyl chloride, and the reaction mixture was stirred on the steam bath for 11 hours. It was then filtered and concentrated to an oil. This concentrate was taken up in ether, and the ethereal solution was washed with water, dried over sodium sulfate, and concentrated. Distillation gave 2.96 g. of yellow liquid from 184° to 190° C. at 1½ mm. Treatment of 2.42 g. of this distillate with an equivalent quantity of hydrogen chloride in absolute alcohol and precipitation by the addition of anhydrous ether gave 2.33 g. of the hydrochloride melting from 170° to 175° C. Purification by crystallization from ethyl acetate gave colorless prismatic needles, M. P. 184°–186° C.

EXAMPLE 4

*N,N-dimethyl-N'-(2-pyridyl)-N'-(p-iodobenzyl) ethylenediamine hydrochloride*

A mixture of the sodium salt of N,N-dimethyl-N'-2-pyridyl)-ethylenediamine in toluene was prepared by heating a stirred mixture of 2.29 g. (.095 mole) of sodium hydride and 16.5 g. (0.1 mole) of N,N-dimethyl-N'-(2-pyridyl) ethylenediamine in 300 cc. of dry toluene slowly to reflux. The mixture was cooled, and after 28.3 g. (.095 mole) of p-iodobenzyl bromide had been added, stirring was continued on the steam bath for 2 hours. The cooled and filtered solution was washed with water and concentrated. Distillation gave 23.6 of a viscous, yellow fraction from 194° to 207° C. at 1 mm. Treatment of 20.2 g. of this liquid with an equivalent quantity of hydrogen chloride in absolute alcohol and precipitation by the addition of ether yielded 21.0 g. of hydrochloride melting from 191° to 195° C. Purification by crystallization from methyl ethyl ketone or from ethyl acetate and alcohol gave fine white needles, M. P. 200°–202° C.

I claim:

1. Compounds of the group consisting of those having the general formula

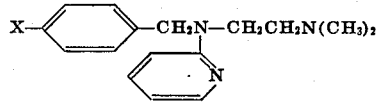

in which X is a halogen and the acid salts of said compounds.

2. N,N - dimethyl - N'-(4-fluorobenzyl)-N'-(2 - pyridyl) ethylenediamine.

3. N,N - dimethyl - N'-(4-bromobenzyl)-N'-(2-pyridyl) ethylenediamine.

4. A method of preparing N,N-dimethyl-N'-(4-halobenzyl) - N' - (2 - pyridyl) ethylenediamines which comprises reacting an alkali metal salt of N,N - dimethyl - N' - (2-pyridyl) ethylenediamine with a p-halobenzyl halide until a N,N-dimethyl-N'-(4-halobenzyl-N'-(2-pyridyl) ethylenediamine is produced and thereafter recovering the said product.

5. A method of preparing N,N-dimethyl-N'-(4-chlorobenzyl) - N' - (2-pyridyl) ethyllenediamine which comprises mixing together under reactive conditions sodium N,N-dimethyl-N'-(2-pyridyl) ethylenediamine and p-chlorobenzyl chloride and after reaction thereof to form N,N-dimethyl-N'-(4-chlorobenzyl)-N'-(2-pyridyl) ethylenediamine recovering the said product.

6. A method of preparing N,N-dimethyl-N'-(4-fluorobenzyl) - N' - (2 - pyridyl) ethylenediamine which comprises mixing together under reactive conditions sodium N,N-dimethyl-N'-(2-pyridyl) ethylenediamine and p-fluorobenzyl chloride and after reaction thereof to form N,N-dimethyl-N'-(4-fluorobenzyl)-N'-(2-pyridyl) ethylenediamine recovering the said product.

7. N,N-dimethyl - N' - (4-chlorobenzyl)-N'-(2-pyridyl) ethylenediamine having the following structural formula:

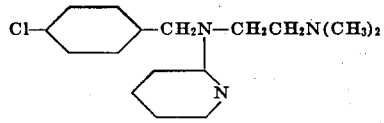

8. A method of preparing N,N-dimethyl-N'-(4-bromobenzyl) - N' - (2-pyridyl)-ethylenediamine which comprises mixing together under reactive conditions sodium N,N-dimethyl-N'-(2-pyridyl)-ethylenediamine and para-bromobenzyl chloride and after reaction thereof to form N,N-dimethyl-N'-(4-bromobenzyl)-N'-(2-pyridyl)-ethylenediamine, recovering the said product.

KENNETH L. HOWARD.

REFERENCES CITED

The following references are of record in the file of this patent:

UNITED STATES PATENTS

| Number | Name | Date |
|---|---|---|
| 2,406,594 | Djerassi et al. | Aug. 27, 1946 |

OTHER REFERENCES

Beilstein, Vierte Auflage, vol. 5, p. 297.